United States Patent

Boyle

[11] Patent Number: 5,858,323
[45] Date of Patent: Jan. 12, 1999

[54] SOL-GEL PREPARATION OF LEAD MAGNESIUM NIOBATE (PMN) POWDERS AND THIN FILMS

[75] Inventor: Timothy J. Boyle, Albuquerque, N. Mex.

[73] Assignee: Sandia Corporation, Albuquerque, N. Mex.

[21] Appl. No.: 890,484

[22] Filed: Jul. 9, 1997

Related U.S. Application Data

[63] Continuation-in-part of Ser. No. 584,845, Jan. 8, 1996, abandoned.

[51] Int. Cl.$^6$ .......................... C01G 21/00; C01G 33/00; C01F 1/00; C07F 9/00
[52] U.S. Cl. .............................. 423/593; 556/42; 427/226
[58] Field of Search ........................... 423/593; 501/135; 427/226; 556/42; 252/182.12

[56] References Cited

U.S. PATENT DOCUMENTS 4,636,248   1/1987   Ogata et al. ........................... 423/593
5,198,269   3/1993   Swartz et al. ........................... 427/226

OTHER PUBLICATIONS

Ravindranathan, P., et al., Ferroelectric Letters, 12, 29, 1990, no month, "Solution–Sol–Gel Processing . . . Thin Films".
Boyle, T.J., et al., Ceram. Trans. First Inter. Symp. Adv. Synthesis Processing, 1995, no month, "Synthesis of Novel . . . Obtained From Them".

Primary Examiner—Steven Bos
Attorney, Agent, or Firm—Elmer A. Klavetter

[57]   ABSTRACT

A method of preparing a lead magnesium niobium oxide (PMN), $Pb(Mg_{1/3}Nb_{2/3})O_3$, precursor solution by a solvent method wherein a liquid solution of a lead-complex PMN precursor is combined with a liquid solution of a niobium-complex PMN precursor, the combined lead- and niobium-complex liquid solutions are reacted with a magnesium-alkyl solution, forming a PMN precursor solution and a lead-based precipitate, and the precipitate is separated from the reacted liquid PMN precursor solution to form a precipitate-free PMN precursor solution. This precursor solution can be processed to form both ferroelectric powders and thin films.

20 Claims, 3 Drawing Sheets

○ = Nb

◐ = O

● = C

SOL-GEL PREPARATION OF LEAD MAGNESIUM NIOBATE (PMN) POWDERS AND THIN FILMS

This application is a continuation-in-part of U.S. patent application Ser. No. 08/584-845, filed on Jan. 8, 1996, now abandoned.

This invention was made with Government support under Contract No. DE-AC04-94AL85000 awarded by the United States Department of Energy. The Government has certain rights in the invention.

BACKGROUND OF THE INVENTION

The perovskite phase of lead magnesium niobate, $Pb(Mg_{1/3}Nb_{2/3})O_3$ (PMN) is of interest for use in thin film capacitors and micro-electromechanical systems due to the very high dielectric constant and the electromechanical properties of PMN. The perovskite phase of PMN is very disordered and considered a classical relaxor ferroelectric. A relaxor ferroelectric can be distinguished from normal ferroelectric material by several properties. First, it has a broad Curie maximum point. The Curie point is the temperature at which ferroelectric material (material in which electric domains tend to be aligned parallel to one another) becomes paraelectric. For PMN, this broad Curie point is reportedly due to lattice and cation disorders which result in short range order, coupled with chemical inhomogeneous microregions. Other characteristics include a diffuse phase transition and a low-frequency dispersion of the dielectric constant. Single crystals of PMN have been shown to have a maximum dielectric constant of about 20,000 at 1 kHz; however, thin film dielectric permitivities are estimated to be around 1250 at room temperature. The electrical differences have been defined by the presence of a pyrochlore phase formed during the initial stages of conversion from metal alkoxides to the ceramic form.

Sol-gel-derived thin films are favored for production of PMN films due to the flexibility in the characteristics of solution precursors, the variety of deposition methodologies, and the reduction of the sintering temperatures. The standard solution approach to generating PMN thin films typically involves either using commercially available precursors and dissolving them in 2-methoxyethanol, which acts as both a solvent and a chemical modifier, or synthesizing large metallorganic "soap-derivative" (neo-decanoate) compounds using organic solvents such as xylenes. For the former method, water is generated as a by-product and further uncontrolled modifications occur. For the latter, identification of intermediates and higher organic pyrolysis temperatures are required due to the increased hydrocarbon content present.

Ravindranathan et al. ("Solution-Sol-Gel Processing of Lead Magnesium Niobate Thin Films," Ferroelectric Letters, Vol. 12, 1990, 29–34) teach a methoxyethanol approach to generating PMN thin films. In that method, commercially available acetates and alkoxides are heated in the presence of methoxyethanol to convert them to the methoxyethoxide derivatives. Ravindranathan's alcohol (methoxyethanol) necessarily serves both as solvent and modifier of precursor material.

In U.S. Pat. No. 4,636,248, issued to Ogata et al. on Jan. 13, 1987, a method is taught for precipitation of PMN precursor powders using metal alkoxides and water in alcohol solution. The alkoxides are mixed together and then hydrolized for 3 hours at elevated temperature to directly form the PMN precursor powders. An improvement would be to prepare a precursor solution from which either powders or thin films could be prepared (see Boyle, T. J., Dimos, D. B., and Moore, G. J., Ceram. Trans., First Internat. Symp. Adv. Synthesis Processing, in press). A further improvement would be to eliminate the hydrolization processing step so that synthesis could be performed without the 3-hr refluxing at elevated temperature.

Swartz et al, (U.S. Pat. No. 5,198,269, issued on Mar. 30, 1993) teach the basic physical process of deposition and heat treatment of metal alkoxide and acetate sol-gel coatings, a method commonly used to make thin films. For example, Swartz et al. disclose the benefit of insensitivity of the first deposition to a substrate, heat treatment to make the deposition isostructural to a second deposition, and further heat treatments—all physical considerations. Swartz et al. also teach the method of preparing thin film ferroelectric material precursors using methoxyethanol by a method similar to that described by Ravindranathan et al. (1990).

SUMMARY OF THE INVENTION

The present invention is principally, but not exclusively, directed to a method of solution chemistry for preparing a precursor solution that can be used to produce the perovskite ferroelectric material, lead magnesium niobium oxide (PMN) as powders and thin films. The method of preparation uses lead and niobium compounds with a magnesium-alkyl compound, keeping the PMN precursors in solution until the PMN precursor powder or thin film is produced. The precursor powder or thin film is then sintered to produce the PMN powder or thin film with ferroelectric properties.

Keeping the precursors in solution greatly facilitates the preparation of both PMN powders and thin films. Because the precursor material is kept in solution and not directly precipitated, water does not have to be added in a hydrolysis reaction which therefore reduces preparation time and eliminates heating during that processing step. To produce PMN precursor powders in the present invention, volatile material is removed from solution by vacuum distillation. Precursor thin films are prepared by direct spin-casting of the precursor solution. The mixed-metal oxide, perovskite phase of PMN in powder form and the mixed-metal oxide, perovskite phase of PMN in thin-film form are produced after sintering.

The present invention does not use a solvent/modifier; but rather a liquid which serves only as solvent. Furthermore, in the present invention, the reaction is not heated (a benefit for industrial applications), alkyls and alkoxides, and not acetates and alkoxides, are used.

BRIEF DESCRIPTION OF THE DRAWINGS

The accompanying drawings, which are incorporated in and form part of the specification, illustrate embodiments of this invention and, together with the description, serve to explain the principles of the invention.

DETAILED DESCRIPTION OF THE INVENTION

A synthesis method is provided for the generation of the perovskite phase of PMN in powder and thin-film form from dissolved precursors in a reproducible way by a sol-gel method. A number of beneficial characteristics, which are not incorporated into existing solution methods, are: 1) less carbon in the precursor solution mixture resulting in a reduced number of carbons to be removed to form the final product; 2) lower temperatures for synthesis of starting materials; 3) more rapid PMN precursor-solution preparation; and 4) comparable or less toxicity of solvent utilized.

In the general preparation method described by this invention, a lead-complex PMN precursor is prepared and combined with a prepared niobium-complex PMN precursor. The resulting solution is reacted with a magnesium-alkyl solution to form a PMN precursor solution. In the preparation of this precursor solution, a precipitate is formed. The PMN precursor solution is separated from the undesired precipitate and from this resulting precursor solution, either PMN precursor powders or thin films can be prepared. PMN precursor powder is produced by removal of all volatile materials through vacuum distillation. PMN thin films are generated by standard spin-cast deposition methods. Both the precursor powders and thin films are converted from the metallorganic species to the mixed-metal oxide $Pb(Mg_{1/3}Nb_{2/3})O_3$ by sintering.

A variety of lead, niobium, and magnesium compounds were investigated for use as starting materials. The reagents evaluated included $Pb(OAc)_4$ ($OAc=O_2CCH_3$), $Mg(OEt)_2$ ($OEt=OCH_2CH_3$), and $Nb(OEt)_5$, which are commercially available, and $Pb(OCH(CH_3)_2)_2$, $Pb(OC(CH_3)_3)_2$, $Pb(OCH_2C(CH_3)_3)_2$, $Mg(OCH(CH_3)_2)_2$, $Mg(OC(CH_3)_3)_2$, $Mg(OCH_2C(CH_3)_3)_2$, and $Nb(OCH_2C(CH_3)_3)_5$, which were synthesized.

Non-reactive organic solvents were also investigated, including acetic acid, 2-methoxyethanol, tetrahydrofuran, methanol. However, a homogeneous solution could not be obtained with these solvent compounds. Acetic acid and 2-methoxyethanol are known to undergo esterification, followed by hydrolysis, and oxolation. The compound 2-methoxyethanol also has toxic and teratogenic characteristics. The commercially-available metallo-organic compounds were found to be insoluble in acetic acid even with heating. Films generated from the tetrahydrofuran or methanol solvated solutions proved to be cracked and opaque. Aromatic hydrocarbon solvents, such as toluene and xylenes, were found to give preferred results in the preparation of the lead-complex precursor and the niobium-complex precursor. Washing of the lead or niobium complexes can be done with any aliphatic solvent with heptanes and hexanes preferred.

Figure 1:
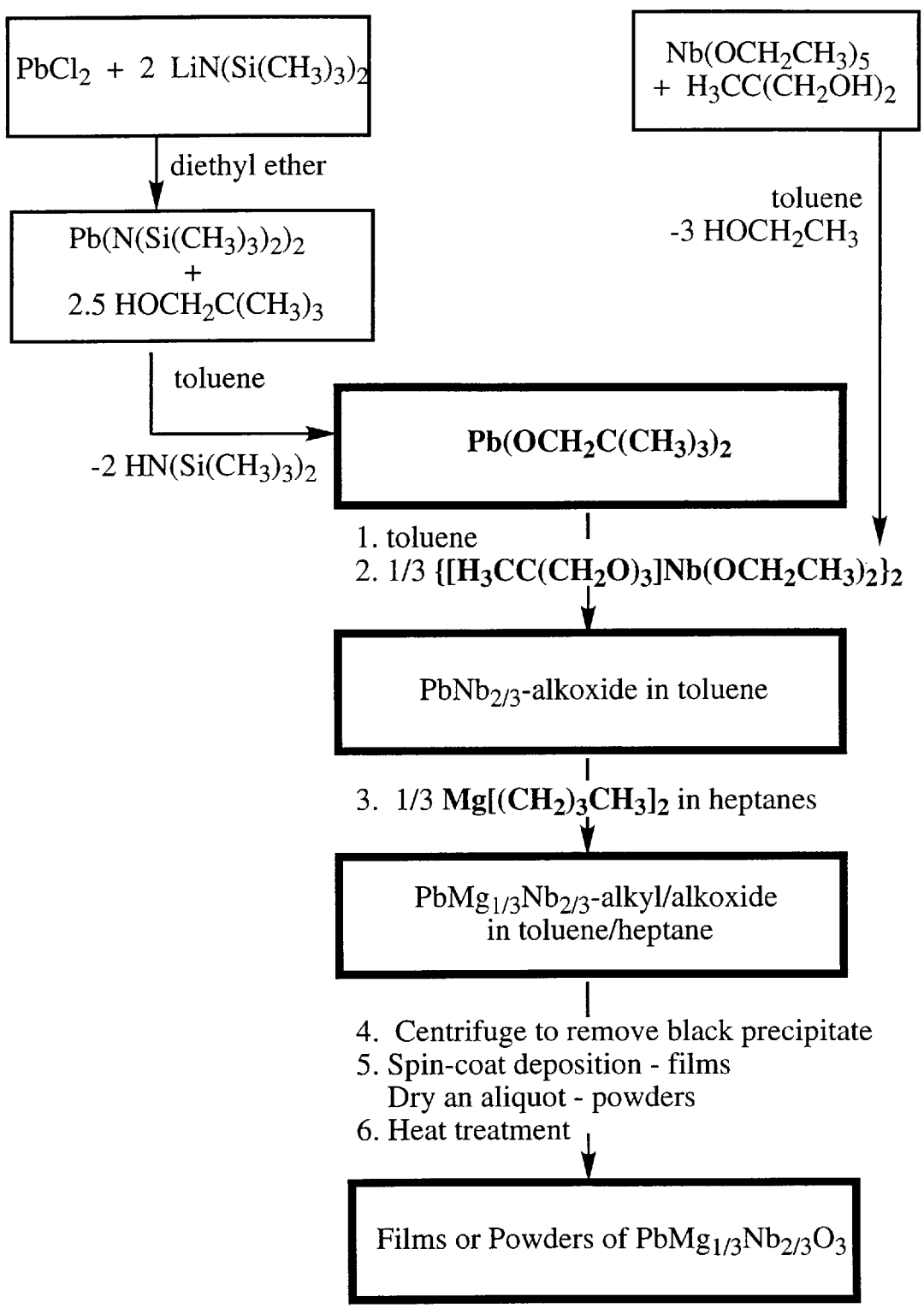
FIG. 1 shows the procedure for the preparation of PMN films and powders from precursor solutions.

Further studies showed that using a magnesium-alkyl compound, such as $Mg((CH_2)_3CH_3)_2$, in combination with the combined lead-complex/niobium-complex solution, achieved increased solubility and decreased reactivity and allowed the production of the perovskite phase of PMN with good electrical properties. The magnesium alkyl is preferably dissolved in an aliphatic solvent, such as heptane or hexane. A further improvement in the film properties was achieved by using for the niobium compound a unique niobium compound that was synthesized and dissolved in an aromatic hydrocarbon solvent, with the chemical formula $\{[H_3CC(CH_2O)_3]Nb(OCH_2CH_3)_2\}_2$. FIG. 1 shows schematically a preferred embodiment of the procedure for the preparation of a precursor solution for production of powders and thin films of PMN. PMN generated using a magnesium alkyl compound along with the synthesized niobium compound by the present solution method described in this invention achieved a uniform perovskite phase material. SEM results showed very little surface defects with this solution method.

EXAMPLES

All reactions were performed under an atmosphere of nitrogen or argon (unless otherwise noted) using standard Schlenk and glovebox techniques. All solvents were distilled using standard techniques. $PbCl_2$ (Aldrich), $Mg[(CH_2)_3CH_3]_2$ (Aldrich, 1M heptanes), $Nb(OCH_2CH_3)_5$ (Aldrich), $(HOCH_2)_3CCH_3$ (Aldrich), $LiN(Si(CH_3)_3)_2$ (Aldrich), and $HOCH_2C(CH_3)_3$ (Aldrich) were used as received. FT-IR data was obtained on a Nicolet, Magna System Spectrometer-550.

Example 1

Preparation of $Pb(N(Si(CH_3)_3)_2)_2$.

$PbCl_2$ (5.00 g, 17.9 mmol) was added to diethyl ether (100 ml). Two equivalents of $LiN(Si(CH_3)_3)_2$ (6.00 g, 35.9 mmol) were added and the reaction stirred for 1 h. The initial white powder was solubilized, the solution turned dark yellow, and a white precipitate was produced. The volatile material was removed and $Pb(N(Si(CH_3)_3)_2)_2$ was extracted with hexanes as a yellow oil which solidified upon cooling—yield 8.00 g, 84.3%.

Example 2

Preparation of $Pb(OCH_2C(CH_3)_3)_2$.

In a Schlenk flask $Pb(N(Si(CH_3)_3)_2)_2$ (13.8 g, 26.2 mmol) was slurried in toluene (100 ml). $HOCH_2C(CH_3)_3$ (5.77 g, 65.6 mmol) was added slowly and the reaction mixture was stirred under argon. Xylenes could also be used as the solvent instead of toluene. After 12 h, the volatile fraction of the reaction mixture was removed in vacuo. $Pb(OCH_2C(CH_3)_3)_2$ was washed with hexanes—yield 9.2 g, 92.0%. Washing with heptanes instead of hexanes produced similar yields. FT-IR (KBr pellet) 2956(s), 2905(w), 2871(w), 2710 (m), 1600(s), 1488(m), 1421(s), 1361(s), 1316(s), 1097(m), 1020(s), 955(s), 800(m), 500(w) cm$^{-1}$.

Example 3

Preparation of $\{[H_3CC(CH_2O)_3]Nb(OCH_2CH_3)_2\}_2$.

Figure 2:
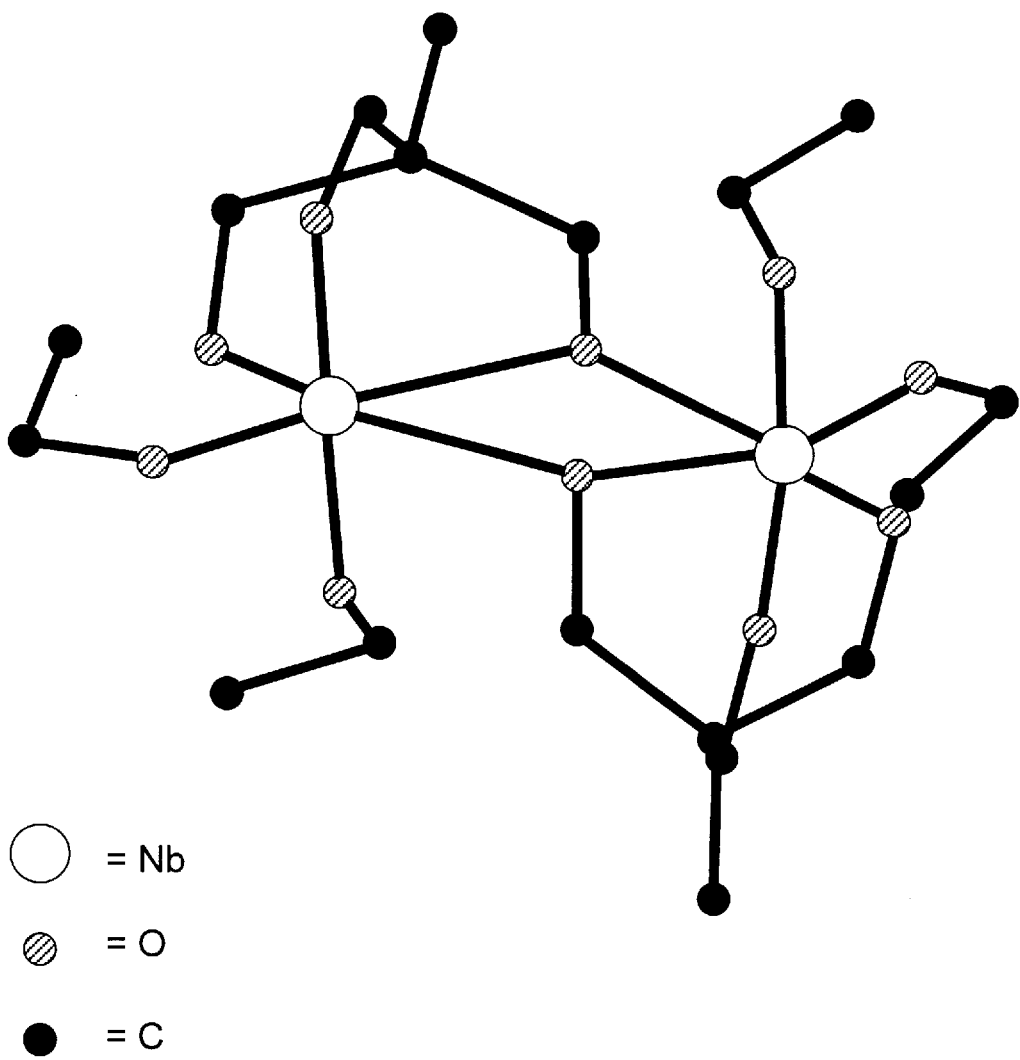
FIG. 2 shows the structure of $\{[H_3CC(CH_2O)_3]Nb(OCH_2CH_3)_2\}_2$ with the hydrogen atoms removed for clarity.

In a Schlenk flask $H_3CC(CH_2OH)_3$ (1.89 g, 15.7 mmol) was added to $Nb(OCH_2CH_3)_5$ (5.00 g, 15.7 mmol) in 70 ml of toluene. Xylene can also be used as the solvent. After stirring the reaction mixture for 12 h the volatile fraction was removed by rotary evaporation. The remaining solid was washed with hexanes three times and extracted with toluene. The resulting white powder can be used without further purification.—yield 3.34 g, 72%. FIG. 2 shows a single-crystal, X-ray-diffraction determined structure for the complex, $\{[H_3CC(CH_2O)_3]Nb(OCH_2CH_3)_2\}_2$. FT-IR (KBr pellet) 2973(s), 2930(s), 2882(s), 2850(s), 2845(s), 2790(w), 2765(w), 2670(w), 1555(m), 1458(m), 1399(m), 1375(m), 1147(s), 1103(s), 1065(s), 1021(s), 1000(m) 989(s), 921(s), 620(s), 535(s) cm$^{-1}$.

Example 4

Preparation of $Pb(Mg_{1/3}Nb_{2/3})O_3$.

A 0.4-M PMN precursor solution was generated by the following method: In one vial, a lead-complex PMN precursor, $Pb(OCH_2C(CH_3)_3)_2$ (1.0 g, 2.7 mmol), was dissolved in hot toluene (3.3 ml) while a niobium-complex PMN precursor, $\{[H_3CC(CH_2O)_3]Nb(OCH_2CH_3)_2\}_2$ (0.54 g, 1.8 mmol), was dissolved in 3.3 ml of toluene in another vial. The two vials of solution were stirred separately for 30 min. These two solutions were mixed and stirred for 5 min. An aliquot of 1-M heptane solution of a magnesium-alkyl compound, $Mg[(CH_2)_3CH_3]_2$ (0.64 g, 0.91 mmol), was added via syringe and this ternary solution was stirred for another 5 min. The resulting black precipitate was separated by centrifugation and the PMN precursor soluble fraction was used for powder and/or film production. Filtration was also used as the method of separation with no change in product.

Example 5

Preparation of $Pb(Mg_{1/3}Nb_{2/3})O_3$.

The PMN precursor solution was prepared as in Example 5 except xylene was used instead of toluene as the solvent for the lead and niobium compounds. Hexane was used instead of heptane as the solvent for the magnesium alkyl compound. The resulting ternary solution was indistinguishable from the solution prepared by Example 5.

Example 6

Thin Film Formation of PMN Precursors

Multi-layered films of PMN precursors were generated by standard spin-coat deposition methods of the PMN precursor solutions generated by either Example 4 or 5, under ambient atmosphere, onto Pt-coated $SiO_2$/Si substrates using a photoresist spinner, (at approximately 3000 rpm for about 10 sec through a 0.1-mm filter). Other substrates may be used. After each deposition, the films were baked on a hot plate (at approximately 300° C. for approximately 5 min) and allowed to cool to room temperature for about 5 min before introduction of the next layer.

Example 7

Powder Formation of PNM Precursors

Precursor PNM powders were produced by removal of all the volatile materials from the PMN precursor solutions of Examples 4 or 5 through vacuum distillation (at about $1 \times 10^{-3}$ Torr).

Example 8

PZT, PLZT, and PZT Ferroelectric Material Production

Figure 3:
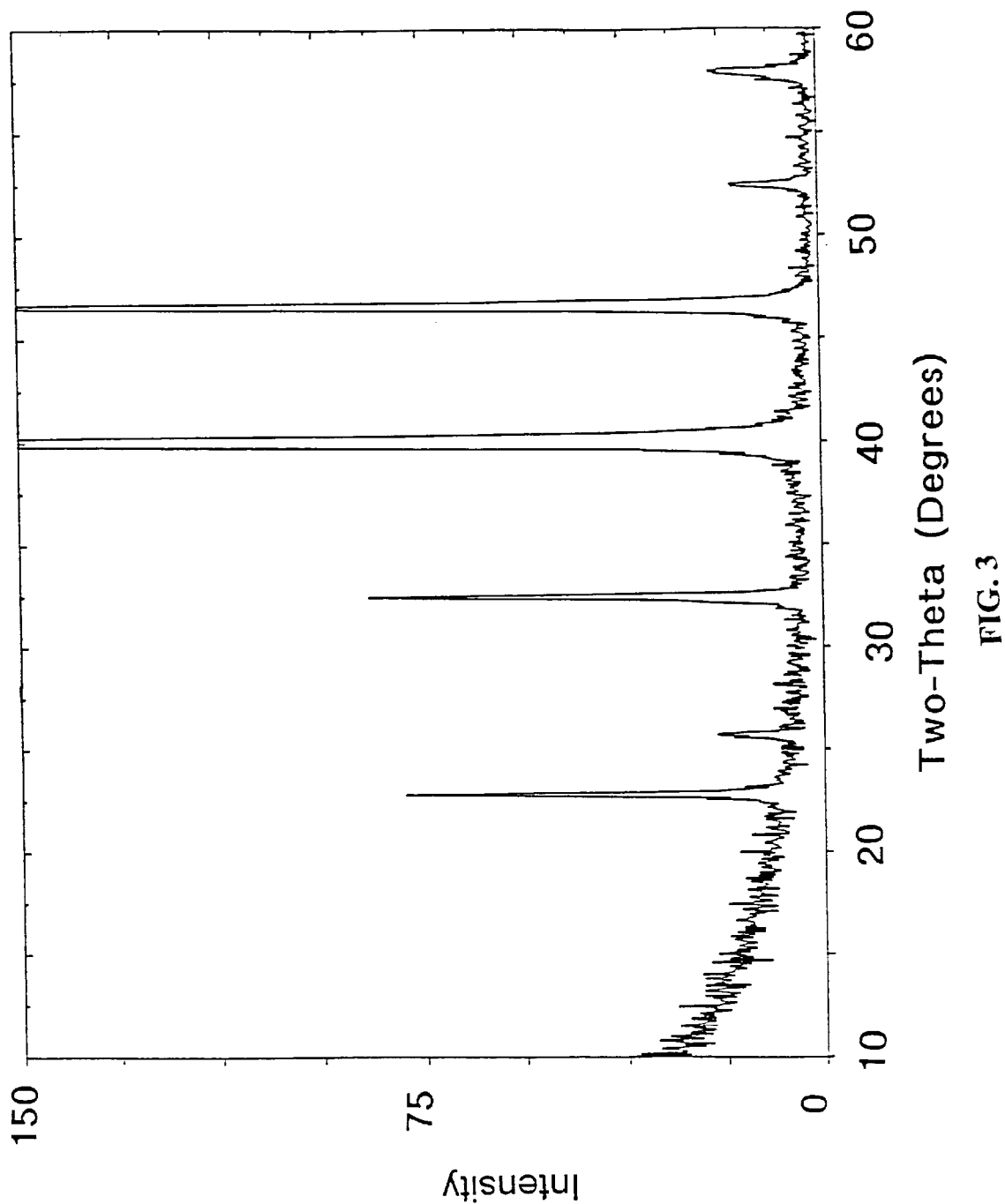
FIG. 3 shows the X-ray diffraction pattern obtained for a thin film of PMN.

Both precursor films and powders from Examples 6 and 7, respectively, are converted from the metallo-organic species to the mixed-metal oxide $Pb(Mg_{1/3}Nb_{2/3})O_3$ material by sintering in a furnace under ambient atmosphere. Sintering can be done by ramping from room temperature to approximately 650° C. using a ramp rate of approximately 20°–25° C./min and holding at about 650° C. for about 30 minutes. X-ray diffraction studies indicated that a slightly distorted perovskite phase of PMN was formed (FIG. 3).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of preparing a lead magnesium niobium oxide (PMN), $Pb(Mg_{1/3}Nb_{2/3})O_3$, precursor solution by a solvent method, comprising the steps of:
   (a) combining a liquid solution of a lead-complex PMN precursor with a liquid solution of a niobium-complex PMN precursor;
   (b) reacting the combined lead- and niobium-complex liquid solutions with a magnesium-alkyl solution, forming a PMN precursor solution and a lead-based precipitate; and
   (c) separating said precipitate from the reacted liquid PMN precursor solution, forming a precipitate-free PMN precursor solution.

2. The method according to claim 1 wherein the precipitate is separated by centrifugation.

3. The method according to claim 1 wherein the precipitate is separated by filtration.

4. The method according to claim 1 wherein the niobium-complex PMN precursor is $\{[H_3CC(CH_2O)_3]Nb(OCH_2CH_3)_2\}_2$.

5. The method according to claim 4 wherein the niobium-complex PMN precursor is produced by reacting $H_3CC(CH_2OH)_3$ with $Nb(OCH_2CH_3)_5$ in an aromatic hydrocarbon solvent, stirring the mixture, removing the volatile fraction by rotary evaporation, washing the resulting precursor powder with hexanes, and extracting the precursor powder with an aromatic hydrocarbon solvent.

6. The method according to claim 5 wherein the aromatic hydrocarbon solvent is selected from the group consisting of toluene and xylenes.

7. The method according to claim 1 wherein the lead-complex solution is $Pb(OCH_2C(CH_3)_3)_2$ in an aromatic hydrocarbon solvent.

8. The method according to claim 1 wherein the niobium-complex solution is $\{[H_3CC(CH_2O)_3]Nb(OCH_2CH_3)_2\}_2$ in an aromatic hydrocarbon solvent.

9. The method according to claim 1 wherein the magnesium-alkyl solution is $Mg[(CH_2)_3CH_3]_2$ in an aliphatic solvent.

10. The method according to claim 9 wherein the aliphatic solvent is selected from the group consisting of hexane and heptane.

11. The method according to claim 1, further comprising the step of distilling the PMN precursor solution under vacuum of about $10^{-3}$ Torr to produce a PMN precursor powder.

12. The method according to claim 11 wherein the PMN precursor powder is converted to the mixed-metal oxide perovskite ferroelectric powder (PMN), $Pb(Mg_{1/3}Nb_{2/3})O_3$, by sintering.

13. The method according to claim 12 wherein sintering is done by heating of the metallorganic powder under ambient atmosphere from room temperature to about 650° C. at a rate of about 25° C./min, holding at about 650° C. for about 30 min, and allowing the powder to cool.

14. A method of preparing the lead magnesium niobium oxide (PMN), $Pb(Mg_{1/3}Nb_{2/3})O_3$, powder by a solvent method, comprising the steps of:
   (a) combining a liquid solution of a lead-complex PMN precursor with a liquid solution of a niobium-complex PMN precursor;
   (b) reacting the combined lead- and niobium-complex liquid solutions with a magnesium-alkyl solution, forming a PMN precursor solution and a lead-based precipitate;
   (c) separating said precipitate from the reacted liquid PMN precursor solution, forming a precipitate-free PMN precursor solution;
   (d) removing the volatiles of the PMN precursor solution under vacuum of about $10^{-3}$ Torr to produce a PMN precursor powder; and
   (e) sintering the PMN precursor powder in a furnace under ambient atmosphere by heating from room temperature to about 650° C. at a rate of about 25° C./min, holding at about 650° C. for about 30 min, and allowing the powder to furnace cool to produce the PMN ferroelectric powder.

15. The method according to claim 1, further comprising the step of spin-cast deposition in air of the precursor solution at about 3000 rpm for about 10 s through a filter with pore size of about 0.1 μm to produce a PMN precursor thin film.

16. The method according to claim 15 wherein the step of producing the thin film comprises spin-cast deposition of the thin film in successive layers, one on top of the other, each layer being heat treated under ambient atmosphere at about 300° C. for about 5 min, and allowed to cool before the deposition of the next layer.

17. The method according to claim 16 wherein the thin film is converted to the mixed-metal oxide thin film, $Pb(Mg_{1/3}Nb_{2/3})O_3$, by sintering.

18. The method according to claim 17 wherein sintering is done by heating of the metallorganic powder under ambient atmosphere from room temperature to about 650° C. at a rate of about 25° C./min, holding at about 650° C. for about 30 min, and allowing the powder to cool.

19. A method of preparing the lead magnesium niobium oxide (PMN), $Pb(Mg_{1/3}Nb_{2/3})O_3$, thin film by a solvent method, comprising the steps of:

(a) combining a liquid solution of a lead-complex PMN precursor with a liquid solution of a niobium-complex PMN precursor;

(b) reacting the combined lead- and niobium-complex liquid solutions with a magnesium-alkyl solution, forming a PMN precursor solution and a lead-based precipitate;

(c) separating said precipitate from the reacted liquid PMN precursor solution, forming a precipitate-free PMN precursor solution;

(d) forming a PMN precursor thin film by spin-cast deposition in air of the precursor solution at about 3000 rpm for about 10 s through a filter with pore size of about 0.1 μm; and (e) sintering the PMN precursor thin film in a furnace under ambient atmosphere by heating from room temperature to about 650° C. at a rate of about 25° C./min, holding at about 650° C. for about 30 min, and allowing the thin film to furnace cool to produce the PMN ferroelectric thin film.

20. The niobium-complex precursor produced by the process of claim 5.

* * * * *